Aug. 27, 1968          M. C. WALKER          3,398,719
BIRDCAGE PERCH OR WALKWAY
Filed July 27, 1966
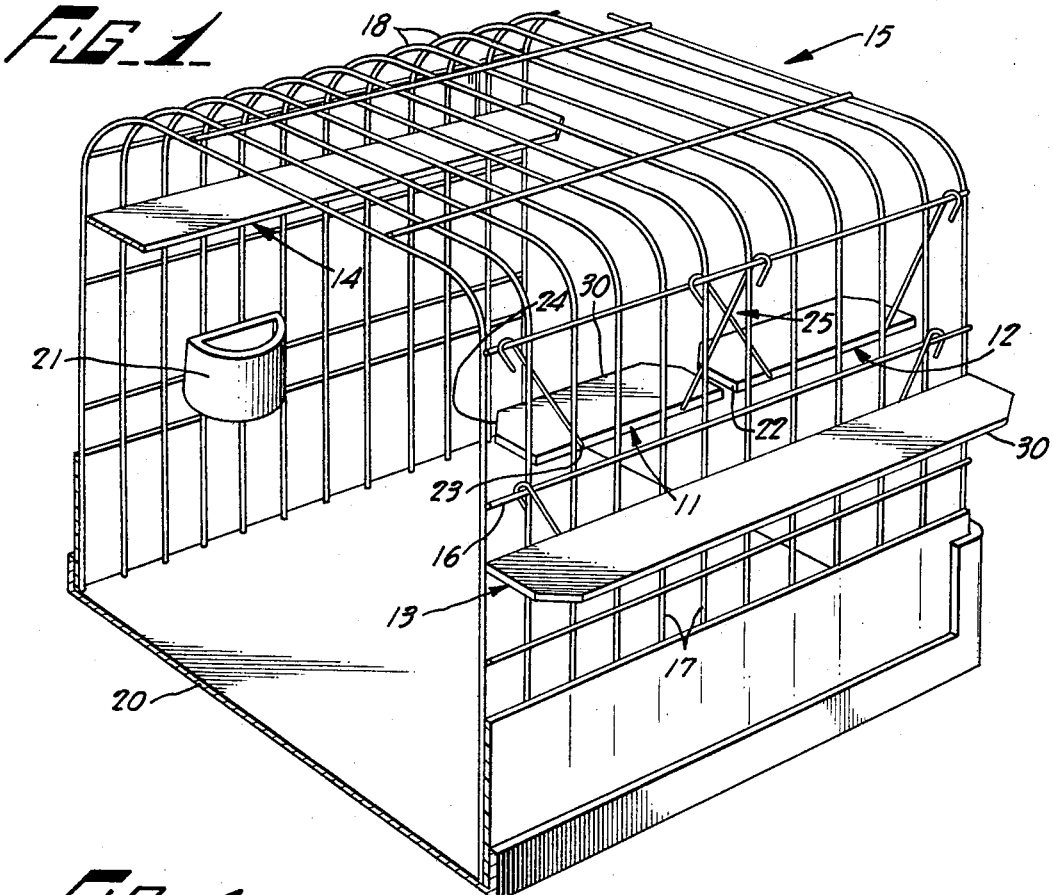
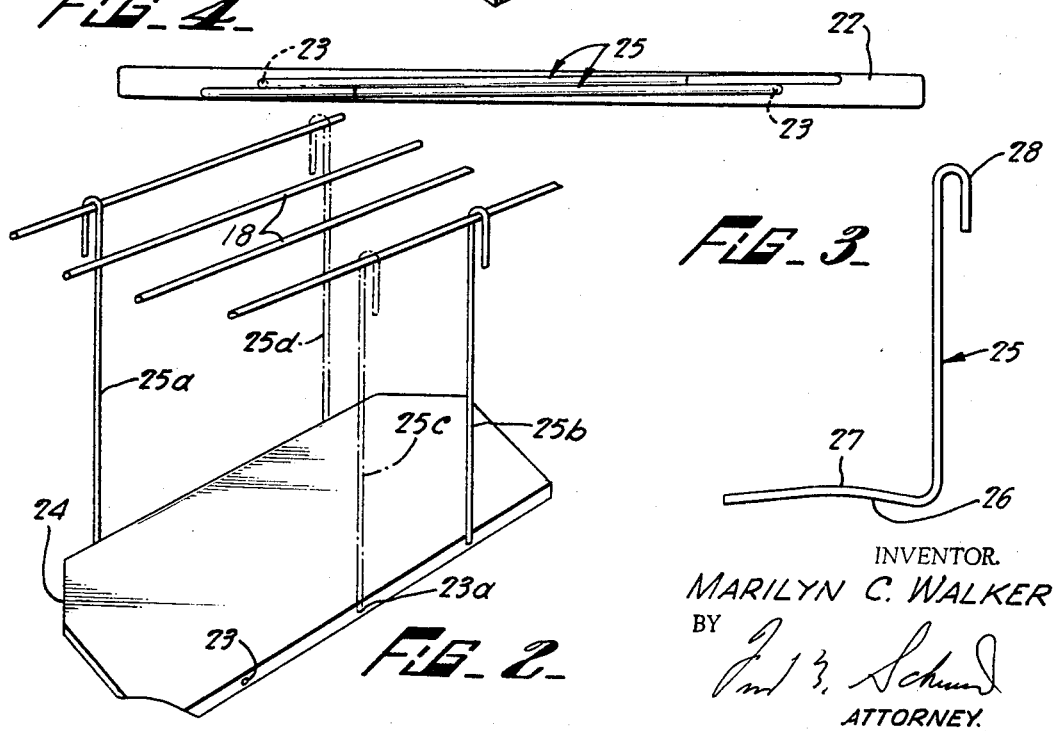
INVENTOR.
MARILYN C. WALKER
BY
ATTORNEY.

United States Patent Office 3,398,719
Patented Aug. 27, 1968

3,398,719
BIRDCAGE PERCH OR WALKWAY
Marilyn C. Walker, 2000 Stadium Way,
Los Angeles, Calif. 90026
Filed July 27, 1966, Ser. No. 568,312
4 Claims. (Cl. 119—26)

ABSTRACT OF THE DISCLOSURE

A walkway for a birdcage comprising a slab having holes in opposite edges thereof to receive hook members pivotally and frictionally inserted therein, the hook members being insertable in certain of the holes. The device is adapted to be adjusted in different angular positions to wires of the cage to form a walkway, swing, or suspended platform.

---

This invention relates to birdcage accessories and has particular reference to walkways or perches for caged birds of all varieties.

It is well known that caged birds instinctively avoid the floors of their cages except when sick. However, I have discovered that birds of the canary, parakeet, finch, cockatiel and other types, prefer to walk or rest on platforms which are elevated above the cage floor instead of attaching themselves to the sides of the cage or perching on the usual rod-type perches. I have also found tha the effect of providing elevated flat walkways is so pronounced as to definitely improve the happiness, relaxation, and consequently, health of all types of caged birds of which I am aware.

I am aware of flat platforms being provided heretofore but these have generally been attached in, or adjacent, the door opening to permit landing and take-off and not as walkways for exercising or relaxing.

It therefore becomes a principal object of the present invention to provide a walkway which can be readily attached at different heights above the floor of a bird cage and in different locations in the cage.

Another object is to provide a walkway which may be readily attached either inside or outside a birdcage.

Another object is to provide a bird walkway of the above type which may be readily collapsed into a flat package for shipping, cleaning, or the like.

Another object is to provide a bird walkway of the above type which may be readily inverted so that both sides may be used as supporting surfaces.

Another object is to provide a bird walkway or platform which may be readily supported from the top of a birdcage to either swing or remain immobile.

Another object is to provide a bird walkway which may be readily attached to the top of sides of most birdcages of different sizes and shapes.

Another object is to protect the food supplies in a birdcage from droppings.

The manner in which the above and other objects of the invention are accomplished will be readily understood on reference to the following specification when read in conjunction with the accompanying drawing, wherein:

FIG. 1 is a perspective view, partly broken away, illustrating a birdcage on which are mounted walkways constructed according to the present invention.

FIG. 2 is a perspective view illustrating the mounting of a walkway as a swing or alternatively as an immovable suspended platform.

FIG. 3 is a side view of one of the hook members.

FIG. 4 is a side view of a walkway in collapsed condition.

Referring to the drawing, walkways generally indicated at 11, 12, 13 and 14 are mounted on a birdcage 15 of conventional construction. The latter is illustrated as of cubical shape but the invention may be equally well applied to birdcages of other shapes and sizes. In accordance with the usual construction, the birdcage is formed of horizontally extending stiff wires 16 and intersecting vertical wires 17. The top of the cage is also formed of intersecting wires 18 and the floor is formed of a sheet metal tray 20. Suitable doors (not shown) are provided to permit access to the interior of the cage and to allow the birds to fly into and out of the cage.

Feeding and watering devices, one of which is shown at 21, may be attached to the sides of the cage in the usual manner.

According to the present invention, each walkway is preferably formed of a slab 22 of plywood in which holes 23 are formed adjacent each end. Such holes may be extended completely through the slab from one edge to the other and parallel to the supporting surface or they may extend only partly through the slab. The outer corners are preferably chamfered at 24.

Hook members 25 are provided to support each slab from the wires of the cage. Each hook member is bent at its lower end to form a pivot section 26 extending generally at 90 degrees to the main portion of the hook member. The pivot section is fitted in one of the holes 23 in the slab and is initially bent slightly at 27 so as to frictionally engage the sides of the hole and thus prevent free swinging of the hook member relative to the slab. The upper end of the hook member is bent back upon itself to form a hook 28 for hooking over one of the cage wires.

When the slab is to be used as a walkway, as shown at 11, 12, 13 and 14, two of the hook members are attached to the same side of the slab and the resulting walkway may be readily hooked on either the inside or the outside of the cage in any desired position. The height of the walkway may be readily adjusted by changing the angle of suspension of the hook members and by engaging the hooks with different cage wires. Also, hook members of different lengths may be used.

It will be noted that the walkway, when placed over the food supply, such as the feeder 21, protects the same from bird droppings.

The slabs 22 may be made of different lengths so as to fit different size cages and a series may be provided to form a continuous walkway around the cage. Also, although the slabs are intended primarily as walkways and rest areas, one may be located adjacent the doorway to form a landing and takeoff platform.

Birds enjoy chewing on the sharp edges of pieces of wood to sharpen their bills, and by forming the slabs of plywood or other wood products, the birds can chew along the upper outer edge 30 of the slab, and when such edge has been rounded off to a curvature such that it is no longer easy to bite into the edge, the walkway may be inverted and the hook members swung around so that the under surface of the slab is now uppermost, presenting a new edge for the birds to chew on. Likewise, the hook members can be attached to the opposite edge of the slab, thus providing two new sharp edges for the birds to chew on.

A further feature resulting from my construction is that the hook members 25 can be folded flush with the edges of the slab, as seen in FIG. 4, to facilitate cleaning or scrubbing of the slab without having to remove the hook members. This feature also facilitates packing, shipping and storage of the walkways.

Another feature of the invention is that the walkway may be readily formed into a swing, as shown in FIG. 2, by mounting two hook members 25a and 25b (as shown in full lines) on opposite edges and at opposite ends and suspending the same from two of the top wires 18 of the cage. The slab may also be suspended from the top wires of the cage as an immovable platform by relocating the hook member 25b in a central position indicated by dot-dash lines 25c by inserting the pivot section thereof in a central hole 23a and by mounting a third hook member indicated by dot-dash lines 25d. Thus a three point suspension is provided. An alternative arrangement for suspending the slab as an immovable platform is to retain the two hook members 25a and 25b in their full line positions in FIG. 2 and mount the third hook member in either of the two positions shown at 25c and 25d.

An additional feature accruing from the wire hook members is that they can be readily bent to attach to the top wires of other types of cages, for example, domed or pitched roof type cages.

I have discovered that by mounting walkways both inside and outside the cage and leaving the doorway open that the birds will fly outside the cage for exercise and will then fly back to land on the outer walkways without tending to perch elsewhere. Apparently this is because they feel safer adjacent the cage and yet they enjoy perching on the flat slabs of the outer walkways. Thus, with this arrangement there is no danger of the birds flying away or perching elsewhere.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto: For example, although slabs formed of wood products are preferred, plastic, metal or other material could be used.

Having thus described the invention, what is desired to be secured by United States Letters Patent is:

1. A walkway or platform for a birdcage having walls formed of spaced wire parts,
    comprising a slab having a pair of spaced holes extending into one edge thereof and parallel to the supporting surface of said slab,
    said holes extending transversely to the length of said slab,
    a pair of hook members independent of each other,
    each of said hook members having a pivot section at one end pivotally mounted in one of said holes and a main section bent at substantially 90° from said pivot section,
    said pivot section frictionally engaging the side of the associated said hole for independent angular adjustment,
    said hook element being bent at the opposite end to form a hook adapted to be hooked onto certain of said wire parts to support said slab.

2. A walkway or platform according to claim 1 wherein said pivot section of each of said hook elements is bent to frictionally engage the sides of the associated said hole.

3. A walkway or platform according to claim 1 wherein said slab has at least one hole extending into the opposite edge thereof and parallel to said supporting surface whereby one of said hook elements may be mounted in said last mentioned hole to form a swing,
    said hook elements being pivotally suspendable from a top wire part of said cage.

4. A walkway or platform according to claim 1 wherein said slab has a pair of additional spaced holes extending into the opposite edge thereof and parallel to said supporting surface whereby an additional said hook element may be mounted in one of said additional holes to form an immobile walkway,
    said hook elements being suspendable from certain of the top wire parts of said cage.

References Cited

UNITED STATES PATENTS

| | | | |
|---|---|---|---|
| 455,042 | 6/1891 | Hendryx | 119—26 |
| 992,167 | 5/1911 | Cousin | 119—26 |
| 1,186,782 | 6/1916 | Hercer | 119—17 |
| 2,713,323 | 7/1955 | Marsh | 119—17 |
| 2,720,860 | 10/1955 | Jenkinson | 119—26 |
| 2,769,426 | 11/1956 | Bromley | 119—17 |
| 2,822,780 | 2/1958 | Buell | 119—17 |
| 3,119,372 | 1/1964 | Gantz | 119—18 |

ALDRICH F. MEDBERY, *Primary Examiner.*